United States Patent Office 3,518,273
Patented June 30, 1970

3,518,273
BENZOPYRANQUINOLINOL DERIVATIVES AND
PROCESS FOR THEIR PRODUCTION
Maximilian von Strandtmann, Rockaway, Marvin P. Cohen, New Milford, and John Shavel, Jr., Mendham, N.J., assignors to Warner-Lambert Pharmaceutical Company, Morris Plains, N.J., a corporation of Delaware
No Drawing. Filed Aug. 3, 1966, Ser. No. 569,832
Int. Cl. C07d 39/00
U.S. Cl. 260—289          8 Claims

ABSTRACT OF THE DISCLOSURE

Pyran derivatives of the formula:

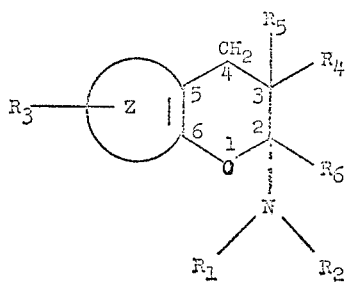

(III)

are disclosed wherein $R_1$ and $R_2$ are each lower alkyl, aralkyl, aryl or $R_1$ and $R_2$ taken together with the nitrogen atom to which they are attached form a piperidine, pyrrolidine or morpholine nucleus; Z represents a carbocyclic or heterocyclic nucleus; $R_3$ is hydrogen, lower alkyl, halogen; $R_4$ and $R_6$ are each hydrogen, lower alkyl, aralkyl, aryl; or $R_4$ and $R_6$ taken together form with the second and third carbon atom of the pyran ring, a saturated aliphatic ring such as cyclopentane, cyclohexane or cycloheptane; $R_5$ is hydrogen or lower alkyl.

The compounds of this invention are useful as intermediates for the production of other pyran derivatives which are useful as anti-microbial agents.

---

This invention relates to pyran derivatives of the formula:

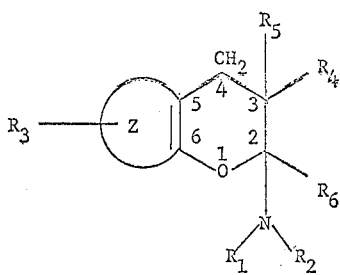

(III)

wherein $R_1$ and $R_2$ are each lower alkyl, aralkyl, aryl or $R_1$ and $R_2$ taken together with the nitrogen atom to which they are attached form a piperidine, pyrrolidine or morpholine nucleus; Z represents a carbocyclic or heterocyclic nucleus such as pyridine, naphthalene, benzene, naphthoquinone, coumarin, isoquinoline quinoline and the like; $R_3$ is hydrogen, lower alkyl, halogen such as chlorine, bromine or fluorine, or lower alkoxy; $R_4$ and $R_6$ are each hydrogen, lower alkyl, aralkyl, aryl; or $R_4$ and $R_6$ taken together form with the second and third carbon atom of the pyran ring a saturated aliphatic ring such as cyclopentane, cyclohexane or cycloheptane, norbornane, or a partially reduced aromatic ring such as indan, Tetralin or Decalin; $R_5$ is hydrogen or lower alkyl.

The term "lower alkyl" and the lower alkyl portion of the term "lower alkoxy" employed herein are to be understood to mean a straight or branched chain alkyl group having from 1 to 7 carbon atoms, e.g. methyl, ethyl, isopropyl, butyl, hexyl, heptyl, etc. The term "aryl" means monohomocyclic or monoheterocyclic ring such as phenyl, pyridyl and the like; and "aralkyl" means "aryl lower alkyl" wherein aryl and lower alkyl are as defined such as phenyl lower alkyl or pyridyl lower alkyl.

The symbols $R_1$, $R_2$, $R_3$, $R_4$, and $R_5$ and $R_6$ used hereinafter have the same meaning as defined.

This invention also encompasses within its scope a novel process for the production of the above compounds.

In addition, the compounds of this invention are useful as intermediates for the production of other pyran derivatives of the formula:

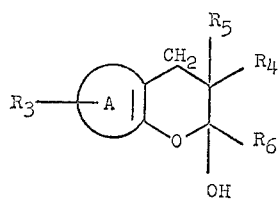

(IV)

which may be prepared from compound III by hydrolysis. Compounds bearing the Formulas III and IV exhibit antimicrobial activity against gram positive bacteria and hypotensive activity. In order to use these compounds about 1 part by weight of the active ingredient is combined with 99% by weight of a inert carrier such as talc or petrolatum to form dosage forms suitable for topical application. They may also be combined with a pharmaceutical carrier to form dosage forms such as tablets, capsules, solutions and the like with the active ingredient being present from 1 to 1000 mg. per dosage unit. The compounds also exhibit anti-protozoal activity such as against species of plasmodia. Compound IV is also embraced within the scope of this invention. Compounds of type IV may be also obtained by a direct condensation of a phenolic Mannich base with a ketone or aldehyde.

Those compounds of Formula IV where $R_5$ is hydrogen can be dehydrated to compounds of Formula V according to scheme (IV)

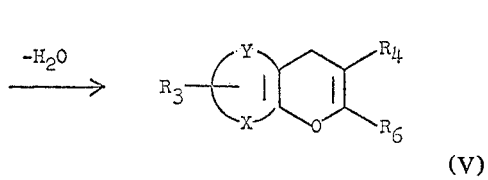

(V)

Convenient dehydrating agents for this reaction are acetic acid in presence of anhydrous sodium acetate, hydrochloric acid, sulfuric acid, polyphosphoric acid, zinc chloride, acetic anhydride, sodium sulfate and the like. Compounds bearing the Formula V are also embraced within the scope of this invention.

According to the process of this invention, the above compounds III are prepared by reacting a Mannich base of the formula:

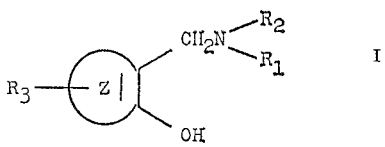

I with an enamine of the formula

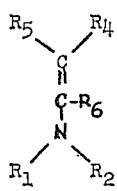

preferably in chemically equivalent amounts.

The reaction is effected by heating the respective reactants in an inert solvent such as diozane at the reflux temperature of the solvent employed. The desired reaction product is recovered from the mother liquor by suitable techniques such as evaporation of the reaction solvent.

The above-described reaction may be used for the preparation of a wide variety of heterocyclic compounds which contain a pyran ring such as pyrano [3,2-b]pyridine, naphtho[2,1-b]pyran, benzopyrano[3,2-b]pyridine, pyrano[3,2-c][1]benzopyran, naphtho[2,3-b]pyran, benzo-[a]xanthene, benzopyrano[3,2-f]quinoline, benzopyrano-[4,3-b][1]benzopyran, pyrano[3,2-f]quinoline, benzopyrano[3,2-h]quinoline and the like.

These are representative of the many types of compounds that may be prepared depending on the Mannich bases and enamines used in the reaction. For example, employing an enamine derived from aldehyde to react with the Mannich base, the compounds obtained may be depicted by the following schematic outline.

(1) With hydrolysis:

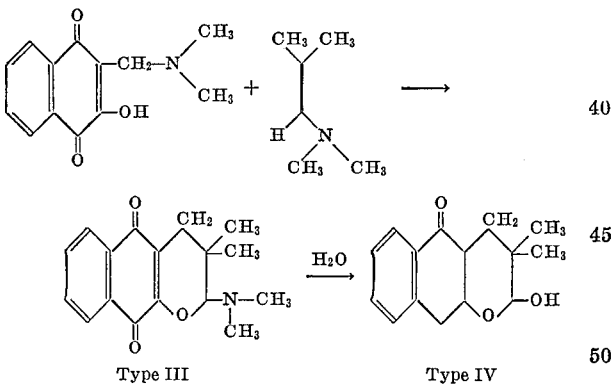

(2) Without hydrolysis:

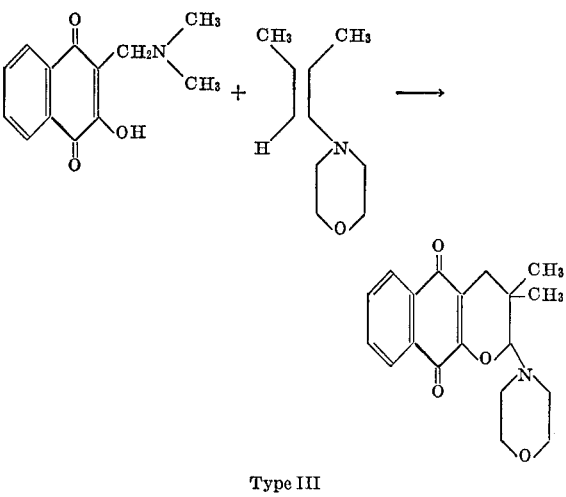

On the other hand employing an enamine derived from a ketone, the reaction may be depicted by the following outline:

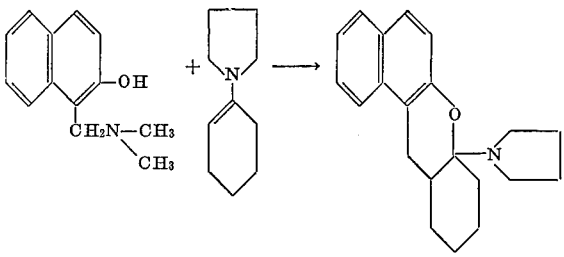

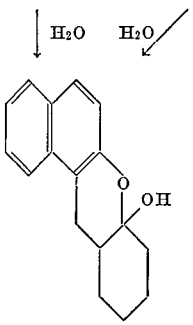

The Mannich bases used as the starting material are prepared by standard methods described in "α-Aminoalkylierung" by H. Hellmann and G. Opitz, Verlag Chemie G.m.b.H., Weinheim, 1960.

The enamines used as the starting materials are prepared by standard methods according to G. Stork et al. (J. Am. Chem. Soc., 85, 207 (1963)) from amines such as dialkylamines, pyrrolidine, morpholine, piperidine, and the like.

In order to further illustrate the practice of this invention, the following examples are given. The temperatures referred to therein are in degrees centigrade.

EXAMPLE 1

8,9,10,11,11a,12-hexahydro-7a-(1-pyrrolidinyl)-7aH-benzo[a]xanthene

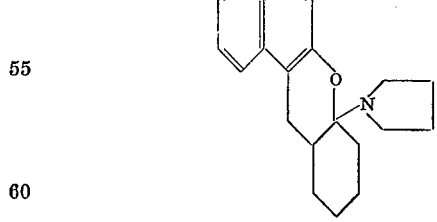

The solution of 10 g. of 1-dimethylaminomethyl-2-naphthol and 7.5 g. of cyclohexanone pyrrolidine enamine in 50 ml. of dioxane was refluxed for 5 days. The solvent was removed in vacuo and the gummy residue was recrystallized from ethyl acetate, M.P. 90–95°; yield 8 g. (52%); $\lambda_{max}$ m$\mu$ ($\epsilon$) 232 (75,600), 266 (4,200), 277 (5,000), 289 (3,900), 317 (2,100), 333 (2,600); $\gamma_{max}$ 740 (ms.), 810 (ms.), 880 (m.), 940 (m.), 990 (ms.), 1150 (m.), 1210 (ms.), 1235 (ms.), 1600 (m.), 1620 (ms.) cm.$^{-1}$.

Analysis.—Calcd. for $C_{21}H_{25}NO$ (percent): C, 82.04; H, 8.20; N, 4.56. Found (percent): C, 81.79; H, 8.28; N, 4.50.

EXAMPLE 2

7a,8,9,10,11,11a-hexahydro-7H-[1]-benzopyrano-[3,2-h]quinolin-11a-ol

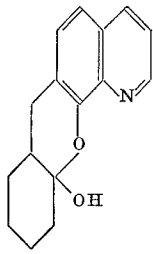

The solution of 10.1 g. of 7-dimethylaminomethyl-8-quinolinol, and 7.55 g. of cyclohexanone pyrrolidine enamine in 50 ml. of dioxane was refluxed for 4 days. The mixture was treated with 10 ml. of $H_2O$, and refluxed for 2 hr. and chilled. The crystalline precipitate was fil- residual gum was recrystallized from abs. ethanol, M.P. 132–135°; yield 2.5 g. (20%); $\lambda_{max}$ m$\mu$ ($\epsilon$) 246 (49,600), 308 (2,800); $\gamma_{max}$ 790 (ms.), 825 (ms.), 915 (s.), 1090 (s.), 1110 (m.), 1210 (m.), 1505 (m.), 3150 (ms.) cm.$^{-1}$.

*Analysis.*—Calcd. for $C_{16}H_{17}NO_2$ (percent): C, 75.27; H, 6.71; N, 5.49. Found (percent): C, 75.37; H, 6.85; N, 5.40.

EXAMPLE 3

8,9,10,11,11a,12-hexahydro-7aH-[1]benzopyrano-[3,2-f]quinolin-7a-ol

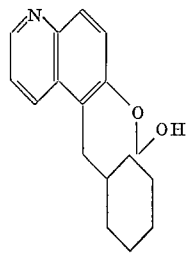

The solution of 15 g. of 5-dimethylaminomethyl-6-quinolinol and 11.3 g. of pyrrolidine enamine of cyclohexanone in 75 ml. of dioxane was refluxed for 4 days. The mixture was treated with 15 ml. of $H_2O$, refluxed for 2 hrs. and chilled. The crystalline precipitate was filtered and recrystallized from abs. ethanol, M.P. 238–240°; yield 16 g. (83%); $\lambda_{max}$ m$\mu$ ($\epsilon$) 241 (44,500), 285 (2,920), 327 (3,520); $\gamma_{max}$ 810 (ms.), 955 (s.), 975 (s.), 1020 (ms.), 1050 (ms.), 1135 (ms.), 1230 (ms.), 1600 (m.), 1615 (m.), 3100 (ms.) cm.$^{-1}$.

*Analysis.*—Calcd. for $C_{16}H_{17}NO_2$ (percent): C, 75.27; H, 6.71; N, 5.49. Found (percent): C, 75.18; H, 6.95; N, 5.50.

EXAMPLE 4

3,4-dihydro-3,3-dimethyl-2H-pyrano[3,2-b]pyridin-2-ol

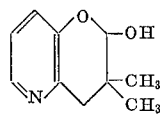

The solution of 7.5 g. of 2-dimethylaminomethyl-3-hydroxypyridine and 5 g. of N,N-dimethylisobutenylamine in 50 ml. of dioxane was refluxed for 13 days. The mixture was treated with 10 ml. of $H_2O$, and refluxed for 2 hr. The solvents were removed in vacuo, and the residual gum was crystallized from ethyl acetate, M.P. 114–117°; yield 3 g. (33%); $\lambda_{max}$ m$\mu$ ($\epsilon$) 219 (11,100), 258 (4,625), 280 (3,600), 326 (3,180); $\gamma_{max}$ 710 (m.), 795 (ms.), 950 (s.), 1090 (ms.), 1110 (ms.), 1190 (ms.), 1240 (ms.), 1580 (mw.), 1590 (mw.) cm.$^{-1}$.

*Analysis.*—Calcd. for $C_{10}H_{13}NO_2$ (percent): C, 67.02; H, 7.31; N, 7.82. Found (percent): C, 67.17; H, 7.38; N, 7.86.

EXAMPLE 5

2,3-dihydro-2,2-dimethyl-3-morpholino-1H-naptho[2,1-b]pyran

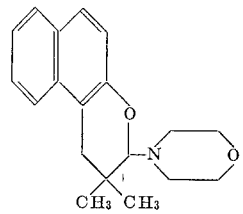

The solution of 10.5 g. of 1-dimethylaminomethyl-2-naphthol, and 7.05 g. of 1-N-morpholino-1-isobutene in 50 ml. of dioxane was refluxed for one week. The solution was treated with 10 ml. of water and refluxed for 2 hr. The solvents were removed in vacuo and the residue was crystallized from acetonitrile, M.P. 154–156°; yield 7 g. (50%); $\lambda_{max}$ m$\mu$ ($\epsilon$) 235 (68,200), 267 (4,800), 278 (5,200), 290 (4,000); $\gamma_{max}$ 740 (ms.), 805 (ms.), 915 (ms.), 925 (ms.), 985 (ms.), 1030 (m.), 1110 (s.), 1235 (ms.), 1595 (m.), 1620 (m.)cm.$^{-1}$.

*Analysis.*—Calcd. for $C_{19}H_{23}NO_2$ (percent): C, 76.73; H, 7.80; N, 4.71. Found (percent): C, 76.69; H, 7.75; N, 4.70.

EXAMPLE 6

6,7,8,9,9a,10-hexahydro-5aH-[1]benzopyrano[3,2-b]pyridin-5a-ol

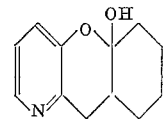

The solution of 7.6 g. of 2-dimethylaminomethylpyrid-3-ol, and 7.55 g. of pyrrolidine enamine of cyclohexanone was refluxed for 2 weeks. The solution was treated with 10 ml. of $H_2O$, and refluxed for 2 hr. The solvents were removed in vacuo and the crystalline residue recrystallized from ethyl acetate, M.P. 153–157.5°; yield 3.9 g. (39%); $\lambda_{max}$ m$\mu$ ($\epsilon$) 220 (6,210), 281 (5,550), 325 (580); $\gamma_{max}$ 790 (ms.), 870 (m.), 950–55 doublet (s.), 1105 (m.), 1255 (s.), 1595 (m.), 3025 (ms.) cm.$^{-1}$.

*Analysis.*—Calcd. for $C_{12}H_{15}NO_2$ (percent): C, 70.22; H, 7.37; N, 6.82. Found (percent): C, 70.45; H, 7.44; N, 6.55.

EXAMPLE 7

3,4-dihydro-2-hydroxy-3,3-dimethyl-2H,5H-pyrano[3,2-c][1]benzopyran-5-one

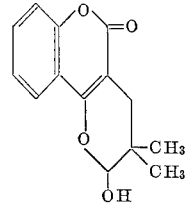

The solution of 11 g of 3-dimethylaminomethyl-4-hydroxycoumarin and 5 g. of N,N-dimethylisobutenylamine in 50 ml. of dioxane was refluxed for 96 hr. After an addition of 10 ml. of $H_2O$, the mixture was refluxed for 2 hrs. and the solvents were removed in vacuo. The residual gum was chromatographed in a column of 400 g. of "Florisil" using ethyl acetate as the eluent. The crystalline fractions were combined and recrystallized from ethyl acetate, M.P. 135–139°; yield 5 g. (40%); $\lambda_{max}$ m$\mu$ ($\epsilon$) 269 (10,500), 281 (12,100), 305 (10,500), 319 (7,000); $\gamma_{max}$ 745 (m.), 895 (ms.), 1045 (ms.), 1170 (ms.), 1580 (m.), 1630 (s.), 1685 (s.), 3400 (ms.) cm.$^{-1}$.

*Analysis.*—Calcd. for $C_{14}H_{14}O_4$ (percent): C, 62.28; H, 5.73. Found (percent): C, 68.55; H, 5.91.

EXAMPLE 8

3,4-dihydro-2-hydroxy-3,3-dimethyl-2H-naphtho[2,3-b]pyran-5,10-dione

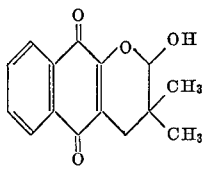

The solution of 11.5 g. of 3-dimethylaminomethyl-2-hydroxy-1,4-naphthoquinone and 5 g. of N,N-dimethylisobutenylamine in 50 ml. of dioxane was refluxed for 4 days. The solution was treated with 10 ml. of $H_2O$ and refluxed for 2 hr. The solvents were removed in vacuo and the residue was recrystallized from abs. ethanol with the aid of charcoal, M.P. 191–193°; yield 5.5 g. (42%); $\lambda_{max}$ m$\mu$ ($\epsilon$) 251 (23,600), 281 (13,600), 331 (2,880); $\gamma_{max}$ 740 (m.), 870 (m.), 950 (ms.), 1065 (ms.), 1190 (ms.), 1580 (m.), 1595 (m.), 1620 (ms.), 1650 (ms.), 1675 (ms.), 3450 (ms.) cm.$^{-1}$.

*Analysis.*—Calcd. for $C_{15}H_{14}O_4$ (percent): C, 69.75; H, 5.46. Found (percent): C, 70.04; H, 5.63.

EXAMPLE 9

3,4-dihybro-3,3-dimethyl-2-morpholino-2H-naphtho[2,3-b]pyran-5,10-dione

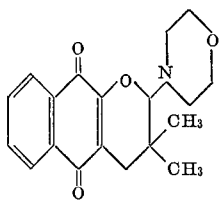

This was prepared from 3-dimethylaminomethyl-2-hydroxy - 1,4 - naphthoquinone, and N - morpholino-1-isobutene in analogous fashion to 3,4-dihydro-3,3-dimethyl - 2 - morpholino-2H,5H-pyrano[3,2-c][1]benzopyran-5-one. Recrystallized from ethyl acetate, M.P. 153–154.5°; yield 43%; $\lambda_{max}$ m$\mu$ ($\epsilon$) 250 (24,000), 279 (14,700), 331 (2,860); $\gamma_{max}$ 720 (ms.), 850 (m.), 955 (ms.), 1115 (ms.), 1195 (ms.), 1250 (ms.), 1575 (m.), 1590 (m.), 1620 (ms.), 1640 (ms.), 1675 (ms.), cm.$^{-1}$.

*Analysis.*—Calculated for $C_{19}H_{21}NO_4$ (percent): C, 69.70; H, 6.47; N, 4.28. Found (percent): C, 69.85; H, 6.63; N, 3.98.

EXAMPLE 10

8,9,10,11,11a,12-hexahydro-7a-H-benzo[a]xanthen-7a-ol

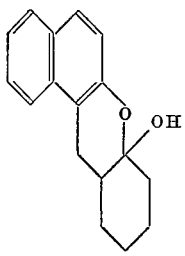

The solution of 10.5 g. of 1-dimethylaminomethyl-2-naphthol and 7.55 g. of pyrrolidine enamine of cyclohexanone in 50 ml. of dioxane was refluxed for one week. Ten ml. of water was added and reflux was continued for 2 hr. The solvents were removed in vacuo and the residual gum was triturated with hot acetonitrile. The crystalline precipitate was filtered off and recrystallized from abs. ethanol, M.P. 143.5–145°; yield 4.4 g. (35%); $\lambda_{max}$ m$\mu$ ($\epsilon$) 222 (76,000), 277 (5,200), 289 (4,100); $\gamma_{max}$ 750 (ms.), 770 (m.), 815 (ms.), 960 doublet (ms.), 975 (ms.), 1030 (ms.), 1130 doublet (ms.), 1225 (ms.), 1510 (mw.), 1600 (m.), 1625 (m.), 3210 (s.) cm.$^{-1}$.

*Analysis.*—Calculated for $C_{17}H_{18}O_2$ (percent): C, 80.28; H, 7.13. Fonnd (percent): C, 80.01; H, 7.05.

EXAMPLE 11

7a,8,9,10,11,11a-hexahydro-11a-hydroxy-6H,7H[1]benzopyrano[4,3-b][1]benzopyran-6-one

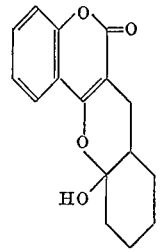

The solution of 11 g. of 3-dimethylaminomethyl-4-hydroxycoumarin and 7.5 g. of pyrrolidine enamine of cyclohexanone in 50 ml. of dioxane was refluxed for 4 days. The mixture was treated with 10 ml. of $H_2O$, and refluxed 2 hr. The solvents were removed in vacuo. The gummy residue was extracted with hot ethyl acetate and the ethyl acetate soluble material was chromatographed on 300 g. of florisil with ethyl acetate development. The fractions which crystallized on concentration were combined, filtered, and recrystallized from absolute ethanol, M.P. 190–194°; $\lambda_{max}$ m$\mu$ ($\epsilon$) 269 (10,200), 281 (11,900), 304 (10,700), 317 (7,300); $\gamma_{max}$ 750 (ms.), 860 (m.), 935 (ms.), 1040 doublet (m.), 1180 (m.), 1270 (m.), 1580 (ms.), 1610 (ms.), 1620 (s.), 1675 (s.), 3375 (m.) cm.$^{-1}$.

*Analysis.*—Calculated for $C_{16}H_{16}O_4$ (percent): C, 70.57; H, 5.92. Found (percent): C, 70.55; H, 6.18.

EXAMPLE 12 (Method B)

7a,8,9,10,11,11a-hexahydro-11a-hydroxy-6H,7H-[1]benzopyrano[4,3-b]benzopyran-6-one

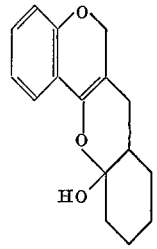

The solution of 11 g. 3 - dimethylaminomethyl-4-hydroxycoumarin and 4.9 g. of cyclohexanone in 50 ml. of dioxane was refluxed for 3 days. The solvent was removed in vacuo and the residue recrystallized from acetonitrile, M.P. 190–94°; yield 6 g. (44%).

EXAMPLE 13

1,2-dihydro-2,2-dimethyl-3H-pyrano[3,2-f]quinolin-3-ol

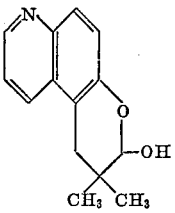

This was prepared from 5 g. of 5-dimethylaminomethyl-6-hydroxyquinoline, and 2.5 g. of N,N - dimethylisobutenylamine in analogous fashion to 8,9,10,11,11a-12-hexahydro - 7aH-[1]benzopyrano[3,2-b]quinolin - 7a-ol. Recrystallized from ethyl acetate, M.P. 201.5–203.5°; yield 2.3 g. (40%); $\lambda_{max}$ m$\mu$ ($\epsilon$) 241 (43,000), 286 (3,000), 327 (3,600); $\gamma_{max}$ 795 (ms.), 825 (ms.), 985 doublet (s.), 1045 (ms.), 1110 (ms.), 1225 (s.), 1510 (m.), 1620 (m.), 3100 (ms.) cm.⁻¹.

*Analysis.*—Calculated for $C_{14}H_{15}NO_2$ (percent): C, 73.74; H, 6.59; N, 6.11. Found (percent): C, 73.58; H, 6.76; N, 6.37.

EXAMPLE 14

8,9,10,11-tetrahydro-12H-benzo[a]xanthene

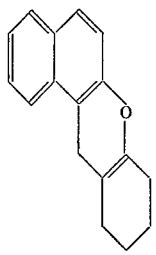

The solution of 5 g. of 8,9,10,11,11a,12-hexahydro-7aH-benzo[a]xanthen-7a-ol and 5 g. of anhydrous sodium acetate in 50 ml. of glacial acetic acid was refluxed for 5 hr., and poured into an ice-water mixture. The precipitate was filtered off, washed with water and recrystallized from abs. ethanol, M.P. 92.5–95°; yield 3.7 g. (79%); $\lambda_{max}$ m$\mu$ ($\epsilon$) 215 (46,000), 219 (51,000), 244 (19,400), 283 (4,000), 322 (1,600), 336 (1,700); $\gamma_{max}$ 755 (m.), 810 (m.), 1120 (m.), 1195 (ms.), 1220 (ms.), 1515 (mw.), 1605 (m.), 1625 (mw.), 1730 (mw.) cm.⁻¹.

*Analysis.*—Calcd. for $C_{17}H_{16}O$ (percent): C, 86.40; H, 6.83. Found (percent): C, 86.53; H, 6.94.

EXAMPLE 15

9,10,11,12-tetrahydro-8H[1]benzopyrano[3,2-f]quinoline

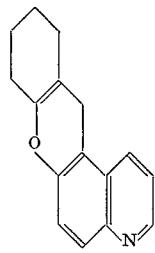

This compound was prepared in analogous fashion to 8,9,10,11-tetrahydro-12H-benzo[a]xanthene from 5 g. of 8,9,10,11,11a,12 - hexahydro - 7aH[1]benzopyrano-[3,2-b]quinolin-7a-ol, M.P. 130–32°; yield 3 g. (63%); $\lambda_{max}$ m$\mu$ ($\epsilon$) 254 (19,700), 336 (2,880); $\gamma_{max}$ 800 ms.), 835 (ms.), 1110 (m.), 1190 (m.), 1230 (m.), 1500 (m.), 1615 (mw.), 1710 (mw.) cm.⁻¹.

*Analysis.*—Calcd. for $C_{16}H_{15}NO$ (percent): C, 80.98; H, 6.37; N, 5.90. Found (percent) C, 81.09; H, 6.37; N, 5.80.

EXAMPLE 16

3,4-dihydro-3,3-dimethyl-2H-pyrano-[3,2-h]quinolin-2-ol

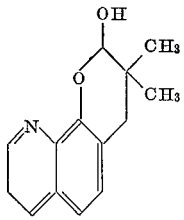

The solution of 10.1 g. of 7-dimethylaminomethyl-8-quinolinol, and 5 g. of N,N-dimethylisobutenylamine in 50 ml. of dioxane was refluxed for 3 days. The mixture was treated with 10 ml. of water, refluxed for 2 hr., and evaporated in vacuo. The crystalline residue was recrystallized from abs. ethanol, M.P. 183–86°; yield 1.5 g. (13%); $\lambda_{max}$ m$\mu$ ($\epsilon$) 244 (48,900), 308 (2,840); $\gamma_{max}$ 790 (m.), 970 (ms.), 1080 (ms.), 1505 (m.), 3175 (m.) cm.⁻¹.

*Analysis.*—Calcd. for $C_{14}H_{15}NO_2$ (percent): C, 73.34; H, 6.59; N, 6.11. Found (percent): C, 73.27; H, 6.78; N, 6.34.

EXAMPLE 17

3,4-dihydro-3,3-dimethyl-2-morpholino-2H,5H-pyrano[3,2-c][1]benzopyran-5-one

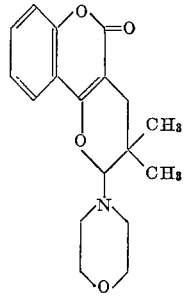

The solution of 11 g. of 3-dimethylaminomethyl-4-hydroxycoumarin and 7.05 g. of 1-N-morpholino-1-isobutene in 50 ml. of dioxane was refluxed for 72 hr. The solvent was removed in vacuo, and the residual gum was recrystallized from ethyl acetate, M.P. 142–144°; yield 6 g. (38%); $\lambda_{max}$ m$\mu$ ($\epsilon$) 269 (10,200), 281 (11,900), 305 (10,600), 318 (7.300); $\gamma_{max}$ 745 (m.), 850 (m.), 1040 (m.), 1110 (m.), 1175 (m.), 1630 (ms.), 1690 (ms.) cm.⁻¹.

*Analysis.*—Calcd. for $C_{18}H_{21}NO_4$ (percent): C, 68.55; H, 6.71; N, 4.44. Found (percent): C, 68.66; H, 6.84; N, 4.72.

What is claimed is:
1. Compounds of the formulas:

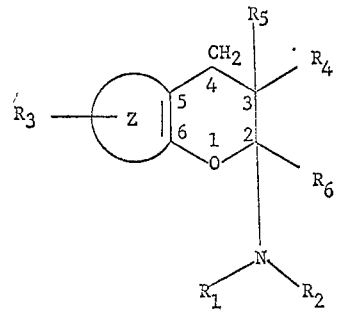

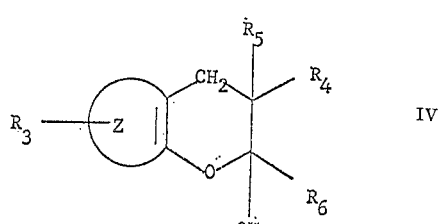

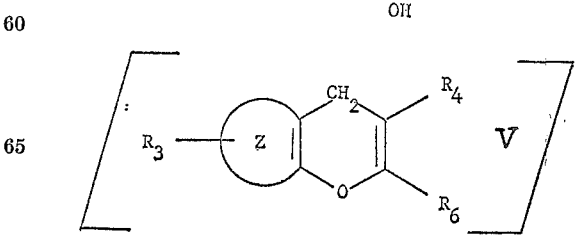

wherein $R_1$ and $R_2$ are each independently n-lower alkyl, phenyl lower alkyl, pyridyl lower alkyl or phenyl; Z is quinoline or isoquinoline; $R_3$ is hydrogen, lower alkyl, halogen or lower alkoxy; $R_4$ and $R_6$ are each independently hydrogen, lower alkyl, phenyl lower alkyl or phenyl; and $R_4$ and $R_6$ taken together with the second and third carbon atom of the pyran ring form cycloalkyl of from 5 to 7 carbons, or a partially reduced aromatic ring selected from indau, tetralin or decalin; $R_5$ is hydrogen or lower alkyl.

2. The compound of claim 1 which is 7a,8,9,10,11,11a-hexahydro-7H-[1]-benzopyrano[3,2-h]quinolin-11a-ol.

3. The compound of claim 1 in which 8,9,10,11,11a,12-hexahydro-7aH-[1]benzopyrano[3,2-f]quinolin-7a-ol.

4. The compound of claim 1 which is 1,2-dihydro-2,2-dimethyl-3H-pyrano[3,2-f]quinolin-3-ol.

5. The compound of claim 1 which is 9,10,11,12-tetrahydro-8H[1]benzopyrano[3,2-f]quinoline.

6. The compound of claim 1 which is 3,4-dihydro-3,3-dimethyl-2H-pyrano[3,2-h]quinolin-2-ol.

7. Process for the production of a compound of the formula:

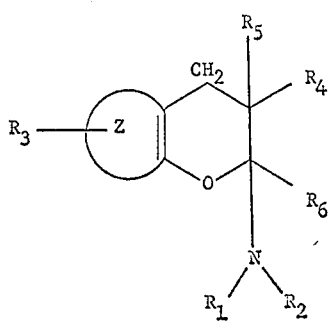

wherein $R_1$ and $R_2$ are each independently n-lower alkyl, phenyl lower alkyl, pyridyl lower alkyl, or phenyl; Z is quinoline or isoquinoline; $R_3$ is hydrogen or lower alkyl, halogen or lower alkoxy; $R_4$ and $R_6$ are each independently hydrogen, lower alkyl, phenyl lower alkyl or phenyl; and $R_4$ and $R_6$ taken together with the second and third carbon atom of the pyran ring form cycloalkyl of from 5 to 7 carbons or a partially reduced aromatic ring selected from indau, tetralin or decalin; $R_5$ is hydrogen or lower alkyl, which comprises contacting a compound of the formula:

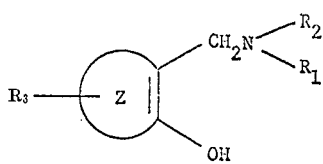

with a compound of the formula:

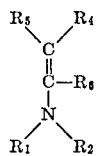

8. Process for the production of a compound of the formula:

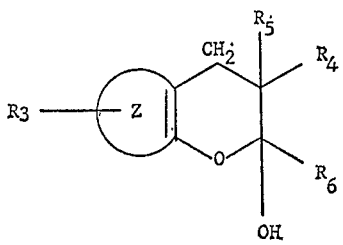

wherein $R_1$ and $R_2$ are each independently n-lower alkyl, phenyl lower alkyl, pyridyl lower alkyl or phenyl; Z is quinoline or isoquinoline; $R_3$ is hydrogen, lower alkyl, halogen or lower alkoxy; $R_4$ and $R_6$ are each independently hydrogen, lower alkyl, phenyl lower alkyl or phenyl; and $R_4$ and $R_6$ taken together with the second and third carbon atom of the pyran ring form cycloalkyl of from 5 to 7 carbons or a partially reduced aromatic ring selected from indau, tetralin or decalin; $R_5$ is hydrogen or lower alkyl, which comprises contacting a compound of the formula:

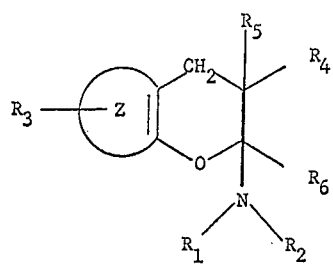

with water under refluxing conditions.

References Cited

UNITED STATES PATENTS

| | | | |
|---|---|---|---|
| 2,358,287 | 9/1944 | Hromatka | 260—345.2 |
| 3,121,086 | 2/1964 | Sartori | 260—289 |
| 3,337,563 | 8/1967 | Skaletzky | 260—294.7 |
| 3,336,340 | 8/1967 | Freimillor | 260—345.2 X |
| 3,337,563 | 8/1967 | Skaletzky | 260—294.7 |
| 3,419,561 | 12/1968 | Jenkins | 260—289 X |

OTHER REFERENCES

Von Strandtmann et al., Tetra Nedron Letters No. 35, pp. 3103–6 (1956).

Ahuja et al., abstracted in (Nem ABSSR, vol. 45, col. 6206–7 (1951).

Von Strandtmann et al., abstracted in Chem. Abstr., vol. 63, col. 18059(d) (1965).

DOUGLAS G. DAUS, Primary Examiner

U.S. Cl. X.R.

260—297, 247.7, 345.2, 335, 294.7, 999, 510.9, 583, 345.5, 247.5, 326.8, 288, 296, 247, 343.2